United States Patent
Zhang et al.

(10) Patent No.: US 7,151,740 B2
(45) Date of Patent: Dec. 19, 2006

(54) TRANSMIT POWER CONTROL FOR AN OFDM-BASED WIRELESS COMMUNICATION SYSTEM

(75) Inventors: Hongliang Zhang, Sammamish, WA (US); Louis Leung, Redmond, WA (US); Jari Heinonen, Seattle, WA (US); Mike Hirano, Redmond, WA (US)

(73) Assignee: Cingular Wireless II, LLC, Atlanta, GA (US)

( * ) Notice: Subject to any disclaimer, the term of this patent is extended or adjusted under 35 U.S.C. 154(b) by 860 days.

(21) Appl. No.: 09/795,630

(22) Filed: Feb. 28, 2001

(65) Prior Publication Data

US 2002/0145968 A1    Oct. 10, 2002

(51) Int. Cl.
*H04J 1/16* (2006.01)
*H04B 7/185* (2006.01)

(52) U.S. Cl. .............. 370/208; 370/252; 370/318; 455/522

(58) Field of Classification Search .............. None
See application file for complete search history.

(56) References Cited

U.S. PATENT DOCUMENTS 5,982,327 A * 11/1999 Vook et al. ............. 342/380
6,041,081 A * 3/2000 O et al. ................... 375/297
6,101,179 A * 8/2000 Soliman .................. 370/342
6,131,016 A * 10/2000 Greenstein et al. ...... 455/69
6,208,669 B1 * 3/2001 Cimini et al. ............ 370/525
6,393,276 B1 * 5/2002 Vanghi .................. 455/422.1
6,404,783 B1 * 6/2002 Cimini et al. ............ 370/525
6,597,723 B1 * 7/2003 Zeira et al. ............. 375/130
6,628,673 B1 * 9/2003 McFarland et al. ...... 370/481
6,628,956 B1 * 9/2003 Bark et al. .............. 455/522
6,728,292 B1 * 4/2004 Zeira et al. ............. 375/130
6,870,826 B1 * 3/2005 Ishizu .................... 370/343
6,888,404 B1 * 5/2005 Ohkawa .................. 330/52

* cited by examiner

*Primary Examiner*—Andrew C. Lee
(74) *Attorney, Agent, or Firm*—Amin & Turocy, LLP

(57) ABSTRACT

An open loop power control system for an orthogonal frequency division modulation (OFDM)-based fixed/mobile wireless system. A preferred system and method comprise measuring signal strength of received interference-free pilot tones transmitted by a base station; determining pathloss according to received power level of pilot tones; and controlling transmit power level of the remote unit by adjusting transmitting channel attenuation according to the pathloss determined in the preceding step. The method may further comprise monitoring at the base station the received signal level of uplink pilot tones; checking if received signal level of uplink pilot tones is outside pre-set limits around the target level at the start of each call; and sending a command to the mobile station over the broadcast channel to increase or decrease the transmitting power level.

16 Claims, 3 Drawing Sheets

TRANSMIT POWER CONTROL FOR AN OFDM-BASED WIRELESS COMMUNICATION SYSTEM

BACKGROUND

The present invention relates to wireless communication, but more specifically, to a method and an apparatus for controlling transmit power levels at plural remote terminals of a wireless communication system using orthogonal frequency-division multiplexing (OFDM).

Economies of mobile telephony, video, and data communication rely on efficient and reliable communication channels. Problems impacting efficiency in fixed and mobile wireless systems include co-channel interference, the multipath fading (slow and fast), near-far issues, noise injection, timing and synchronization, line-of-sight issues, and system implementation (e.g., software algorithms), all of which degrade the signal-to-noise ratio. In a wireless environment, present-day modulation schemes include (time-division multiple access) TDMA, (code-division multiple access) CDMA, (orthogonal frequency-division multiplexing) OFDM, and others that are established by various standards organizations. Apart from transceiver implementation, modulation schemes used in the wireless system respond differently to co-channel interference and fading relative to the physical path (e.g., obstructions and terrain).

Traditionally, the above-stated problems are addressed at the receiver by regulating transmit power, providing adaptive automatic gain control (AGC), employing enhanced error detection and correction, slowing symbol transmission or reception rates, and/or other solutions. Because downlink (from a base station) and uplink (from a remote unit) transmissions often face different challenges, solutions employed in the respective uplink and downlink paths may differ. For example, uplink and downlink paths in a fixed wireless system are relatively constant (except for objects moving in and about the path of transmission) and thus, the respective transceivers at each end of the system may perform the same or similar modulation and demodulation (modem) techniques. In a mobile wireless system, however, the paths invariably change and required power levels at the mobile terminals must compensate for near-far issues in order to reduce, among other things, undue co-channel interference, synchronization problems, and timing errors. Issues common to fixed and mobile wireless include weather, noise injection, co-channel and intersymbol interference, etc.

In many wireless systems, transmit power control plays an important role in obtaining reliable and efficient communication among multiple users, e.g., remote cellular telephone and data units, since transmit power substantially impacts intersymbol and co-channel interference. Open loop transmit power control is particularly advantageous, but implementation of such control is extremely challenging for OFDM transmission systems where modem techniques at the physical layer substantially differ from those of TDMA, CDMA, and other data transmission and sub-channelization systems.

A solution to at least some of the above-mentioned problems is proposed by U.S. Pat. No. 6,101,179 entitled "Accurate Open Loop Power Control in a Code Division Multiple Access Communication System" assigned to Qualcomm, Inc., which is directed to a digital wireless communication system. The '179 patent discloses a method and apparatus for performing open loop power control in a code division multiple access (CDMA) communication system. The '179 patent discloses transmit power in a mobile unit of a CDMA communication system having a base station that transmits a "pilot" signal to the remote unit. The method includes calculating, at the base station, a base station pilot transmit power value, and a base station receiver sensitivity value and transmitting these values to the mobile stations. In response, the mobile station calculates a path loss and a mean output transmit power to compensate for near-far issues.

A similar problem is addressed by a system disclosed in U.S. Pat. No. 6,011,980 entitled "Wireless Telecommunication Equipment" and assigned to Oki Electric Industry Co., Ltd. The '980 patent"), which is also directed to transmit power control of a mobile station of a CDMA cellular telephone system. The '980 system has a base station and a plurality of mobile stations where each mobile station includes a receiver portion, a transmitter portion, and a transmit power level controller. It teaches automatic gain control amplifier having a gain that is varied in accordance with a control signal, and a transmit power control amplifier having a gain varied in accordance with an open loop control signal. In addition, the '980 patent teaches the automatic gain control and the transmission power control amplifiers having the same operating characteristics.

These and other prior methods and systems that provide control of transmit power at a remote unit do not appear to be applicable to problems confronting OFDM communication systems.

SUMMARY OF THE INVENTION

In accordance with the present invention, there is provided a method of controlling the transmitting power level of a transmitter in an orthogonal frequency division modulation (OFDM)-based fixed/mobile wireless system. A preferred method comprises measuring or detecting the power level of received pilot tones transmitted over at least one sub-channel of an OFDM transmission; determining pathloss according to received power level of pilot tones; and controlling transmit power level of the transmitter by adjusting the power level or channel attenuation according to the pathloss determined in the preceding step. Optionally, the method may further comprise monitoring at a base station the received signal level of uplink pilot tones; checking if received signal level of uplink pilot tones is outside pre-set limits around the target level at the start of a call; and sending a command to a mobile station over a broadcast channel to increase or decrease the transmitting power level.

In accordance with another aspect of the invention, an apparatus that controls the power of a mobile station in an OFDM-based wireless system comprises a base station having a receiving channel and a transmittal channel; a remote unit having a receiving channel and a transmittal channel wirelessly connected to said base station; an automatic gain control circuit for conducting a pathloss measurement between the base station and the remote unit wherein said pathloss measurement is based on a strength of transmitted signals of known power; and a transceiver located in the remote unit having the transmitting power level thereof set by adjusting an attenuation reading in the transmitting channel according to the readings of the automatic gain control circuit.

Other aspects, features, and advantages of the invention will become apparent upon review of the following description taken in connection with the accompanying drawings. The invention, though, is pointed out with particularity by the appended claims.

DESCRIPTION OF ILLUSTRATIVE EMBODIMENTS

As known in the art, OFDM transmission systems use broadband techniques to transmit data in multiple time-parallel, narrow band sub-channels. Use of Fast Fourier Transforms (FFT) impulse response systems make them relatively easy to implement at the transceiver. In an OFDM transmission, an original digital data stream is multiplexed into multiple parallel data streams which, in turn, are carried in multiple parallel narrow band sub-channels of the broadband OFDM transmission. In the OFDM transmitter, an Inverse Fast Fourier Transform forms a pulse that comprises the data modulated sub-carriers and, at the receiver, a Fast Fourier Transform processor separates the sub-channels into to narrow band carriers. These narrow band sub-carriers are then demodulated to obtain the original data.

Figure 1:
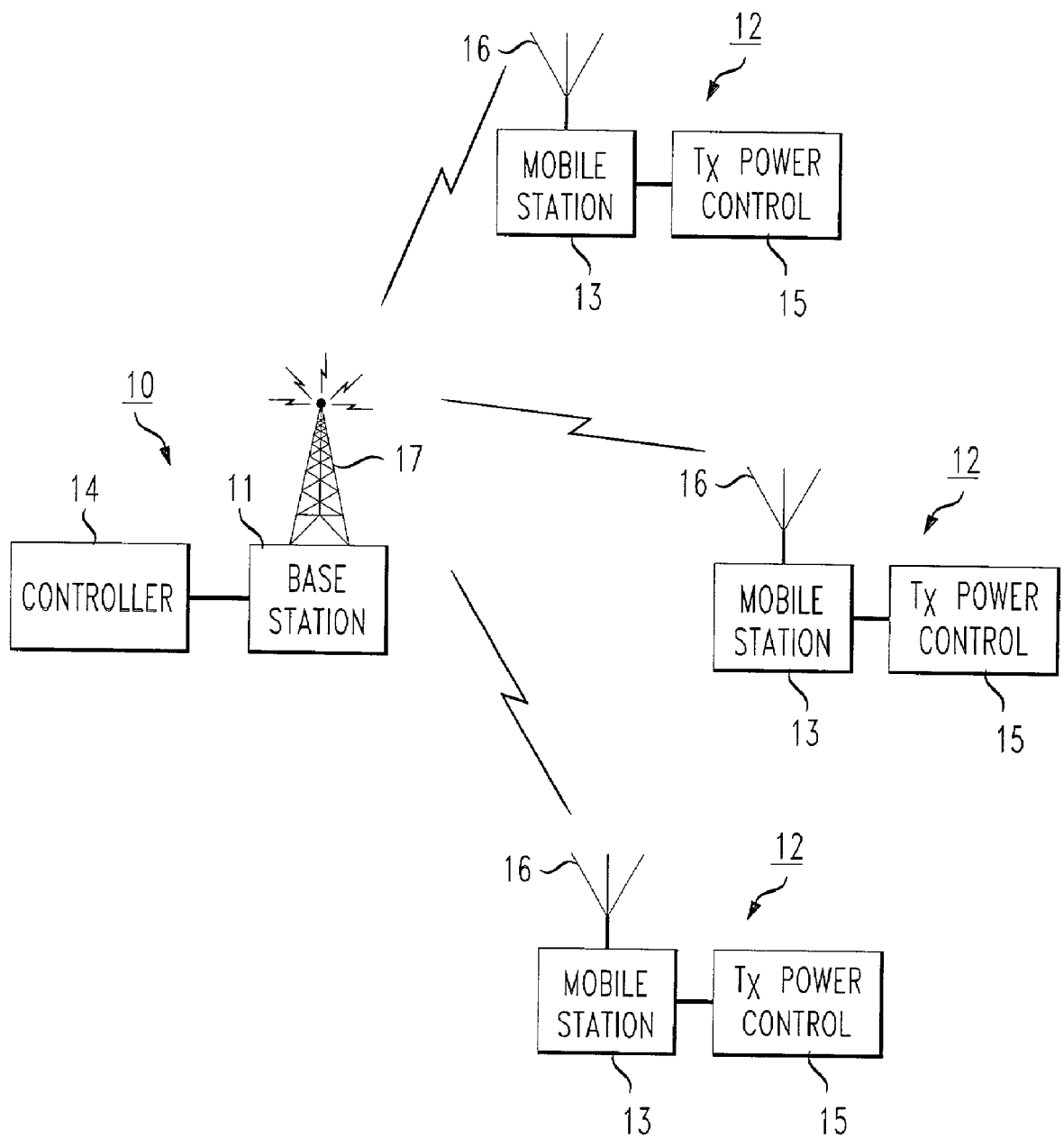
FIG. 1 shows a wireless communication system including a base station and multiple remote units located in a cell or service area in which aspects of the invention may be employed.

The present invention provides open loop power control in an OFDM system, as generally depicted in FIG. 1, which shows a base station 10 and multiple remote units 12 within a cell or service area of base station 10. In addition to the remote unit itself determining its own transmit power level, the invention optionally provides feedback information generated at and broadcast from the base station (BS) 10 to verify and issue commands to control the transmit power levels of multiple remote units 12. In an exemplary embodiment, the OFDM transmission system uses 320 parallel sub-channels or sub-carriers, nine of which are dedicated to carrying continuous wave pilot tone signals of known power transmit power levels in order for providing power control at the remote ends of the wireless communication system. As a minimum, at least one sub-channel is required for conveying the tone signal but in practice, multiple sub-channels are used. These pilot tones are transmitted from the base station 10 at a known power level and are subsequently detected at the remote units to determine path loss. Path loss information is then used to adjust transmit power level of the transmitter at the remote units 12. Advantageously, receiver gain indicated by the AGC set points at the remote unit is representative of path loss since AGC gain is automatically adjusted to normalize the received signal for signal processing.

As depicted in FIG. 1, base station 10 includes, among other things, a controller 14 and transceiver hardware 11 while the remote units 12 include, among other things, transceiver hardware 13 and transmit power controller 15. Remote units 12 may, for example, comprise telephony or data terminal devices that communicate in a PCS wireless access network (PWAN) or other type of wireless network using standard or proprietary protocols. Within the service area of base station 10, remote units 12 typically have varying path lengths and path losses relative to its respective transmission path to/from base station 10 and their communication channels are subjected to diverse interference, fading, and noise injection. In a given coverage area, multiple base station are typically deployed, each serving a number of remote units. Transmissions within the conglomeration of remote units and base stations tend to interfere with overall system operation. System capacity, however, is optimized by controlling transmit power levels of the remote units 12 to substantially normalize their received signal strength at the base station 10.

Although FIG. 1 illustrates a mobile wireless system, the methods and systems described herein may also be deployed in a fixed wireless system. The open-loop control system and methods disclosed herein are preferably implemented in physical hardware or firmware at the physical layers of the network access channel (NAC) and uplink data traffic channel, but may indeed, be implemented in software. In addition, principles of the invention may be deployed in systems other than OFDM systems.

The illustrative open-loop power control technique and system of the present invention include determining the respective path losses of pilot signals transmitted from base station 10 to the remote units 12. The receiving unit synchronization pilot signals (RSPs) which, in one embodiment of the invention, comprise a series of constant level tones transmitted in 3.2-kilohertz subchannels, are typically transmitted during normal call set up routines (which are not described herein) and have a known strength and/or noise immunity. In one embodiment, nine out of three hundred-and-twenty sub-channels are allocated to carrying pilot tones signals although more or less can be used. The magnitude of the tone signals are monitored at remote stations 12. Based on the strength of the received tone signals, remote station 12 determines path loss in the physical path between the remote unit and base station 10, and then adjusts the transmit power level of the remote station to compensate for the path loss.

The base station 10 transmits RSPs that the remote units 12 use for synchronization. Some of the RSPs are used for frequency synchronization, and other RSPs used for time-synchronization (i.e., the time-keyed RSPs). A time-keyed descriptor carried in the RSPs comes about because of the on-off way the base station transmits them for synchronization, as generally known in the art. The time-keyed RSPs also are used as described in the AGC algorithm set forth herein. The time-keyed RSPs suffer less co-channel interference than the other RSPs because they are transmitted in a round-robin fashion; that is, each base station in a coverage area of base stations takes its turn transmitting the time-keyed RSPs—hence less co-channel interference. In one embodiment of the invention, there are 17 RSPs transmitted by the base station. Of these, eight are time-keyed and the other nine are 'simulcast' RSPs. The simulcast RSPs are so named because they are transmitted by all base stations simultaneously, i.e., there is no time reuse as there is for the time-keyed RSPs.

Optionally or in addition to the remote unit 12 controlling its own transmit power level, the base station 10 may issue transmit power level control signals to the remote unit 12 by simultaneously monitoring the received signal level of uplink pilot tones transmitted by the remote units 12. If the uplink pilot signal received at base station 10 lies within a preset range, no action is taken. On the other hand, base station 10 commands an identified remote unit to reduce transmit power if the received remote-transmitted signal is too strong and just the opposite if the signal is too weak. This is done by sending to the identified remote subscriber unit a two-bit command signal (or any other multi-bit or other type of control signal) to direct that remote unit to either increase or decrease its transmit power level. The two-bit command signal preferably instructs the remote unit to increase or decrease transmit power level in three to six dB steps. This procedure may be carried out for each remote unit within the service area of the base station. Path loss at base station 10 is reflected in an AGC circuit of controller 14, which adjusts itself to maintain a desired signal level, noise rejection, and/or signal-to-noise ratio. The adjustments required to maintain desired AGC gain levels are indicative of path loss. Further, the uplink pilot tone signals may be transmitted over one or more sub-channels.

After receipt of the power control signal transmitted from base station 10, the associated remote unit 12 responds by adjusting its own transmit power level according to the information contained in the control signal. In this way, the remote units collectively meet at the base station receiver pre-set target signal levels of their received transmissions.

Path loss in the downlink path from base station 10 to the remote stations 12 becomes evident from receive channel attenuation readings reflected in the automatic gain control (AGC) circuit of receiver. Thus, the path loss measurement is actually performed by the AGC circuit. Transmit controller 15 at a respective remote station 12 adjusts the transmit power levels at the remote units to the appropriate optimized level by controlling transmit channel attenuation according to the remote station AGC readings, which are based on signal levels broadcast by the base station. In this way, the remote units are neither overpowered, which increases co-channel interference and objectionable RF noise among other remote units in the service area, nor underpowered, which degrades the received signal and disproportionately lowers noise rejection due to co-channel interference. In effect, the transmit power levels at the remote unit adaptively follow or compensate for varying path losses in accordance with the base station AGC readings. Advantageously, overall system capacity is increased by the methods and apparatuses of the present invention.

For the sake of simplicity, parts of the open loop control system are implemented in the RF subsystem of the remote unit's AGC circuit. Generally, the relationship between the remote unit's transmit power $P_t$ and received signal power $P_r$ for open-loop power control can be described by the following equation:

$$P_t^{(m)} = K - P_r^{(m)} \text{(in dB)} \qquad \text{(Eq. 1.1)}$$

where $P_t^{(m)}$ is the new transmit power at time m at the remote unit 12 for the uplink transmission; $P_r^{(m)}$ is the received signal power (RSP) at the remote unit in the downlink at time m of a signal received from base station 10; and K is a system constant that is determined based on a number of system parameters. $P_r^{(m)}$ is mainly used to measure the downlink pathloss. The equality relationship expressed in Eq. 1.1 and elsewhere in this description may be replaced with an approximation, and still meet the features and advantages of the invention. In the exemplary PCS wireless access network system, $P_r$ is representative of the received signal power of time-keyed pilot tones transmitted by base station 10 to the remote units because, unlike data signals carried in other subchannels, the time-keyed RSP tones do not suffer from co-channel interference.

To enable the remote station controller 15 to estimate the received signal power $P_r^{(m)}$ received at the remote unit, this term in Eq. 1.1 is replaced by the downlink received signal strength indicator (RSSI) of the time-keyed RSP tones because the transmitting power per tone for the RSP tones signal at the base station is known. The RSSI of the time-keyed RSP tone signal at the remote unit baseband, $RSSI_b$, is calculated as follows:

$$RSSI_b = \frac{1}{N} \sum a_i \cdot a_i^*, \text{ for } i = 0 \text{ to } N-1 \qquad \text{(Eq. 1.2)}$$

where $a_i$, for i=0, 1, 2, 3 ..., N−1, are complex coefficients of the time-keyed RSP tones. By way of example, the number N of subchannels used for pilot tone signals is nine, e.g., N=9, in the exemplary OFDM system of FIG. 1.

Given the $RSSI_b$ and the gain G from the modem baseband controller to the RF input port of the remote unit receive path, the RSSI of the RSP tone signal at the input port of the remote unit RF is estimated as follows:

$$RSSI = RSSI_b/G \qquad \text{(Eq. 1.3)}$$

At the remote units 12, the RSSI of Eq. 1.3 is calculated for every incoming time-keyed RSP tone signal which, in the illustrated embodiment, appear at 480 milliseconds intervals. The intervals or periodicity, of course, may vary. In addition, the RSSI is weighted with an exponential function with a forget factor of α, preferably every time the time-keyed RSP tone signal is available. The weighted function is given as follows:

$$RSSI(k) = \alpha RSSI(k-1) + (1-\alpha) RSSI \qquad \text{(Eq. 1.4)}$$

where k is the time index for the incoming time-keyed RSP signal. If a two-branch diversity system is deployed, for example, the resulting RSSI is given as follows:

$$RSSI = \frac{RSSI_1 + RSSI_2}{2} \qquad \text{(Eq. 1.5)}$$

where $RSSI_1$ and $RSSI_2$ are the RSSI of the time-keyed RSP signal in branches one and two of the diversity system, respectively. The weighting function here is the same as in Eq. 1.4. In a remote unit used in a PCS wireless access network, for example, the resulting RSSI for a two-branch cross-polarization diversity system is given as follows:

$$RSSI = max(RSSI_1, RSSI_2). \qquad \text{(Eq. 1.6)}$$

This is to prevent the AGC circuit from amplifying noise and co-channel interference when the signal of one branch is very weak.

The system constant K of Eq. 1.1 is also determined. The selection of the constant K assures that the received signal level at the base station is sufficiently large to maintain minimum system performance, e.g., SINR=20 dB. The system constant K, in dB, is determined by the following equation:

$$K = P\_RSP\_tone + \Delta - G_B + (N_0 + I)_{dB} + SINR \qquad \text{(Eq. 1.7)}$$

where Δ is the average pathloss difference between the downlink and the uplink; P_RSP_tone is the base station antenna effective irradiated power (EIRP) per tone of the RSP tone signal; $G_B$ is the total gain from the base station antenna to the base station modem ASIC baseband, including base station antenna gain; $N_0$ is the total noise power per traffic tone in the base station baseband; I is the average co-channel interference power per traffic tone in the base station baseband.

For the network access channel (NAC), I=0 and the system constant K, in dB, is determined as follows:

$$K = P\_RSP\_tone + \Delta - G_B + N_0 + SINR \quad (Eq.\ 1.8)$$

The SINR is the target signal to interference plus noise ratio. In a PWAN system, this is about 18 dB, which corresponds to a Reed-Solomon block error rate of $10^{-2}$.

Substituting the system constant K in Eq. 1.1 with Eq. 1.8, the uplink transmit power $P_t^{(m)}$ at the RF output of the remote unit antenna 16 is represented by:

$$\begin{aligned} P_t^{(m)} &= K - P_r^{(m)} \quad (Eq.\ 1.9)\\ &= P\_RSP\_tone + \Delta - G_B + N_0 + SINR - P_r^{(m)}\\ &= P\_RSP\_tone + \Delta - G_B + N_0 + SINR - RSSI^{(m)}\\ &= PL^{(m)} + \Delta - G_B + N_0 + SINR \end{aligned}$$

where $PL^{(m)}$ is the estimated downlink propagation pathloss between the base station antenna 17 and the RF input to the remote unit 12 and $PL^{(m)} = P\_RSP\_tone - RSSI^{(m)}$.

Figure 2:
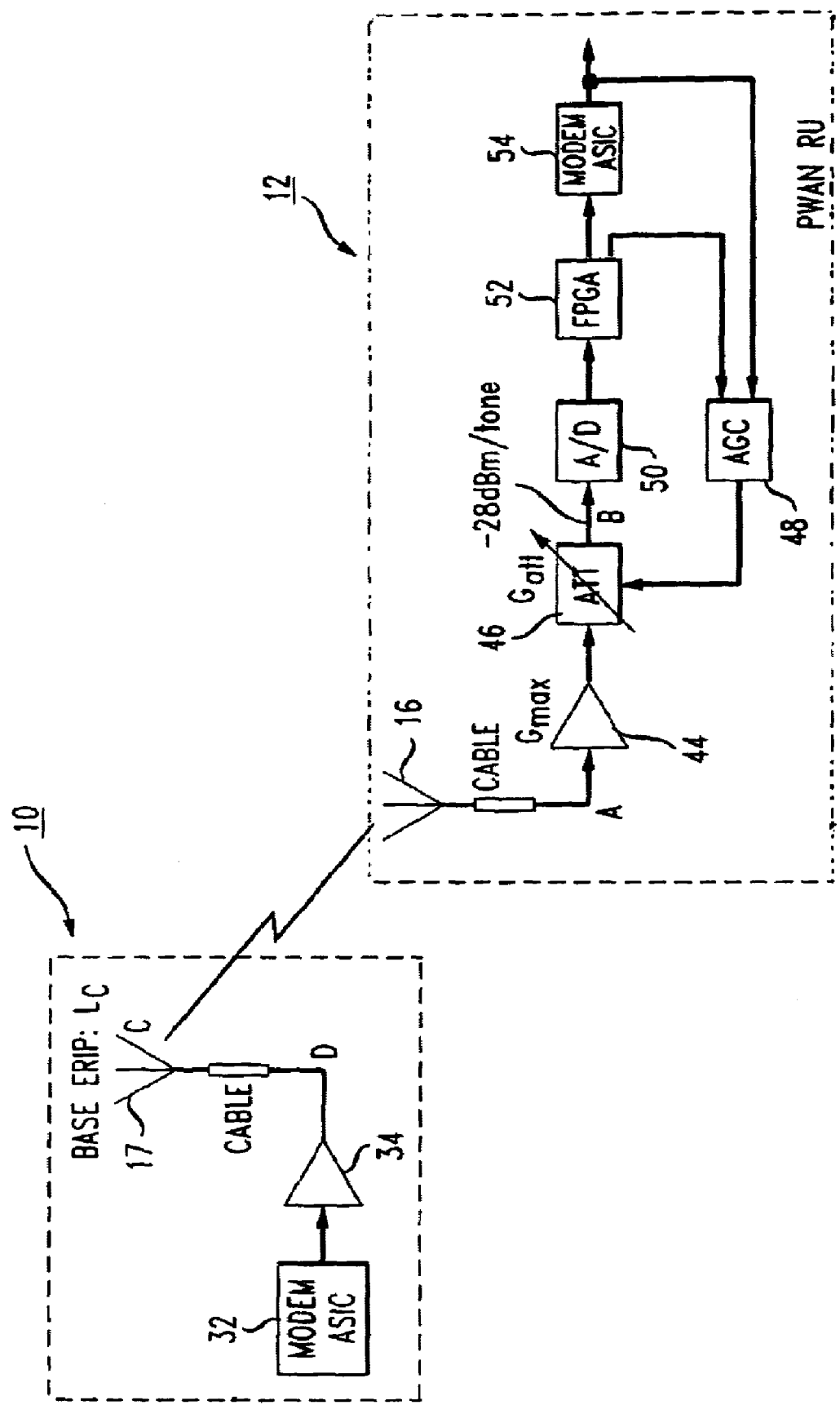
FIG. 2 illustrates the signal processing path in a downlink RF transmission from a base station to a remote unit.

FIG. 2 depicts the signal path in the downlink channel. As shown in FIG. 2, base station 10 includes a modem ASIC 32, amplifier 34, and antenna 17. Modem ASIC 32 serves as an interface between digital data signals of a base station controller and OFDM RF signals transmitted over the wireless network, including OFDM multiplexing and sub-channeling functions, as well as data modulation. Such operations are known in the art. Amplifier 34 amplifies RF signals produced by the modem ASIC 32 prior to supplying the same to the transmission antenna 17.

At the receiving end, receiver module 12 of the remote unit includes an antenna 16 that receives RF signals transmitted from a station 10 and supplies the same to an amplifier 44. Amplifier 44 amplifies the incoming RF signals in accordance with gain Gmax. The amplified incoming signal, which carries either data or control signals, is supplied to a variable attenuator 46 that responds to an AGC circuit 48 in order to adjust the level of the incoming amplified RF signal before supplying the same to an analog-to-digital (A/D) converter 50. The A/D converter 50 converts the incoming analog RF signal to digital form and supplies the same to a field programmable gate array circuit (FPGA) 52. The FPGA circuit 52 performs, among other things, data blocking, error correction, and other functions to condition the information for transmission to a modem ASIC 54 that serves as an interface to other processing circuits of the remote unit 12, including demodulation and serializing multiple digital data streams conveyed in the transmitted OFDM signal. Functions of ASIC 52 may include, but are not limited to, the transfer of voice, video, data or other information with a data terminal or user.

In operation, the AGC circuit 48 keeps the RSSI of the time-keyed RSP tone signals at the baseband constant by adjusting the AGC gain attenuator 46. This is accomplished by maintaining the signal level at point "B" constant at, for example, a gain of −28 dBm/tone. The base station transmitting power (EIRP) is maintained at a constant level of $L_C$ dBm/tone. Therefore, the received signal strength at point "A" of FIG. 2 is represented as follows:

$$\begin{aligned} L_A &= L_B - (Gmax - Gatt) \quad (Eq.\ 1.10)\\ &= Gatt - Gmax + L_B \end{aligned}$$

where Gmax is the maximum gain of the remote unit received path between points A and B; Gatt is the AGC gain attenuation reading; and $L_B$ is the signal power level at point B of FIG. 2. $L_B = -28$ dBm/tone. Therefore, the pathloss PL between point "C" and point "A" of FIG. 2 is determined as follows:

$$\begin{aligned} PL &= L_C - L_A \quad (Eq.\ 1.11)\\ &= L_C - (Gatt - Gmax + L_B) \end{aligned}$$

where $L_C$ is the base station antenna effective irradiated power per tone. The pathloss PL includes the loss in the remote unit antenna 16.

Figure 3:
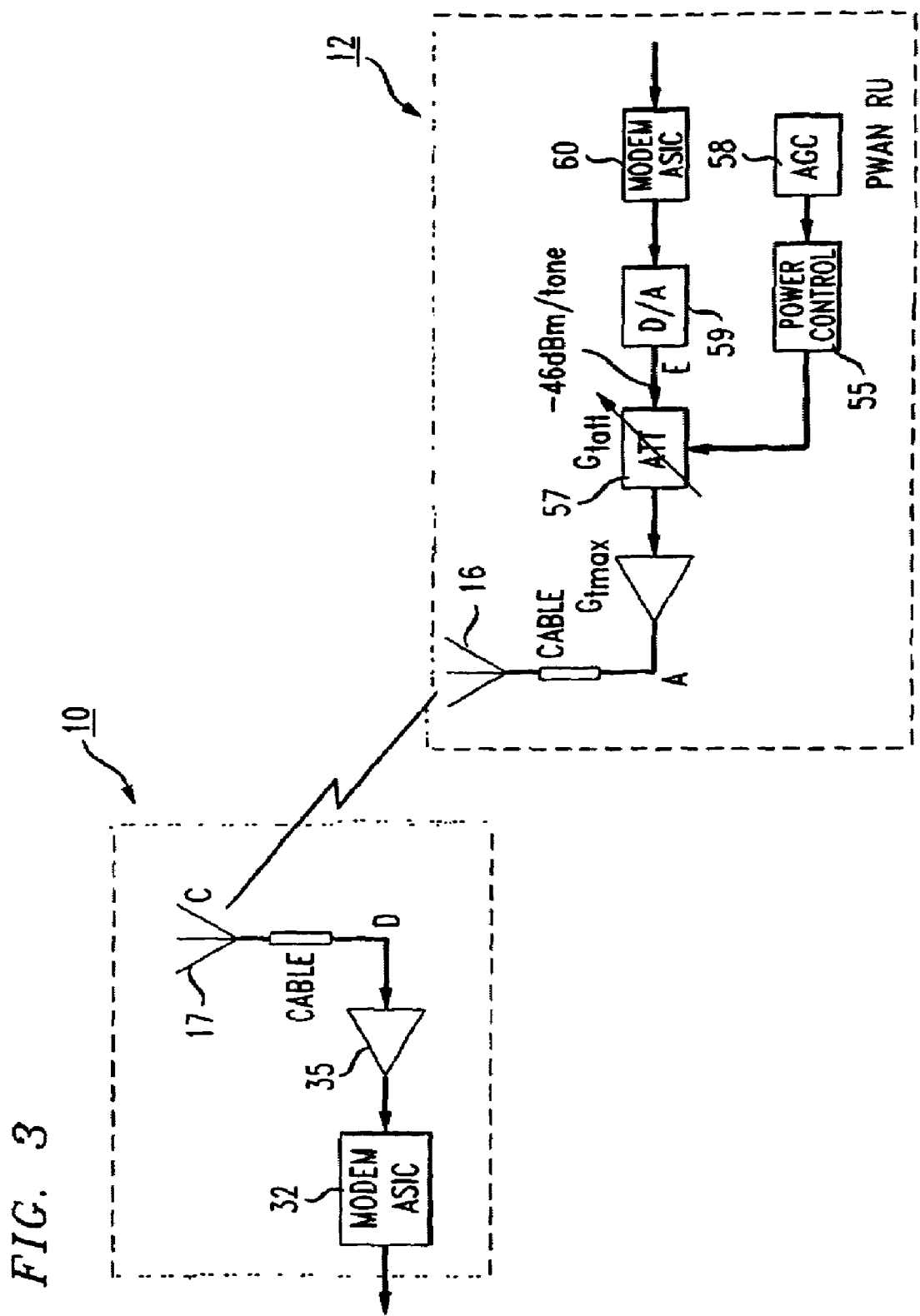
FIG. 3 illustrates the signal processing path in an uplink RF transmission from a remote unit to a base station.

FIG. 3 illustrates the uplink signal transmission path from the remote unit 12 to the base station 10. In FIG. 3, the base station 10 includes a receiving antenna 17, amplifier 35, and modem ASIC 32. Transmit power control algorithms at the remote unit 12 is performed by digital signal processor (DSP) 58 and power controller 55. The remote unit 12 also include a D/A converter 59, which translates digital data to analog form suitable for RF transmission, and a modem ASCI 60 for interfacing data and control channels for the remote unit. These components perform operations similar to like components described in connection with FIG. 2.

The uplink transmit power $L_{TA}$ at point "A" of FIG. 3 is controlled by the power control 55, which adjusts the variable attenuator 57 in order to maintain transmit power according to the following relationship:

$$i\ L_{TA} = L_{RD} - G_{bx} - G_{TTA} + L_{CS} + PL \quad (Eq.\ 1.12)$$

where $L_{TA}$ is the uplink transmit power at point "A" of FIG. 3; $L_{RD}$ is the received signal level at the base station at point "D"; $G_{BX}$ is the antenna gain at the base station; Gatt, as it applies to base station receiver, is the base station tower top amplifier gain; and $L_{CS}$ is the cable loss in the transmission path between the amplifier and the antenna at the base station. Thus, according to the uplink transmission path as depicted in FIG. 3, the uplink transmit power $L_{TA}$ is expressed by the following relationship;

$$L_{TA} = L_E + Gtmax - Gatt \quad (Eq.\ 1.13)$$

where $L_E$ is the signal power at point "D" of FIG. 3 (e.g., the output power level of the D/A converter); Gtmax is the maximum gain in the transmitting path of the remote unit from point "E" to point "A"; and Gtatt is the gain of the attenuator in the remote unit transmit path that is controlled by the power control algorithm and system according to a preferred aspect of the present invention.

Combining Eq. 1.11, 1.12, and 1.13, the gain dictated by power control unit 55 in order for controlling the upstream transmit power at the remote unit 12 is determined by following relationship:

$$Gtatt = (L_E + Gtmax - Gmax + G_{TTA} - L_{TD} - L_{RD} + L_B) + Gatt \quad (Eq.\ 1.14)$$

where $L_{TD} = L_C - G_{BX} + L_{CS}$ is the transmit power at the base station for the downlink transmission at point "D" of FIG. 3. Lref denotes the minimum received signal level at point "D" that is required for the base station required to demodulate both the network access control channel (NAC) signals and the uplink data traffic signals. Accordingly, the gain Gtatt for maintaining open loop power control in the PCS wireless access network is expressed as follows:

$$Gtatt=(L_E+Gtmax-Gmax+G_{TTA}-L_{TD}-Lref+L_B)+Gatt \quad \text{(Eq. 1.16)}$$

Once the remote unit AGC gain attenuation reading, Gatt, is known, then the transmit attenuation setting for attenuator 57, Gtatt, may be determined by power control unit 55 in accordance with Eq. 1.16. For example, if an exemplary transmit power control system has the following parameters:

$L_D$=−46 dBm/tone
Gtmax=59.5 dB
Gmax=93.5 dB
$L_{TD}$=4.5 dB
Lref=−108 dBm/tone
$L_B$=−28 dBm/tone,
$G_{TTA}$=0 dB then, the power control gain implemented by power control 55 is determined in accordance with Eq. 1.16, as follows:

$$Gtatt=-4.5+Gatt \ (in \ dB) \quad \text{(Eq. 1.17)}$$

As illustrated above, Eq. 1.16 is a practical open loop control algorithm which may be implemented by the controlled unit 55 based on pilot tone signals transmitted from base station 10 in order to control the transmit power of remote unit 12 within prescribed limits which, in turn, provides increased system capacity, minimizes co-channel interference, and achieves other advantages described herein. In order to reduce the effects of the time varying AGC gain attenuation readings in the open power control algorithm, the average of Gtatt is determined as follows:

$$Gavg\_tatt(k)=\alpha \cdot Gtatt+(1-\alpha) \cdot Gavg\_tatt(k-1) \quad \text{(Eq. 1.1)}$$

where $\alpha$ is the "forget factor" for a moving average of Gtatt, which is about 0.7 in the implementation illustrated above, Gtatt is previously defined, and $Gavg_{13} tatt(k)$ is the average value of Gtatt at tine index k. Eq. 1.18 is updated about every 480 milliseconds, as previously indicated.

As described above, the illustrative systems and methods described above provide open loop power control at remote ends of an OFDM transmission system, as well as feedback information to the remote unit relative about the received signal power level received at the base station. Each of plural remote units within a given service area of a base station (e.g. a cell) implements comparable open loop power control. Feedback information received by the remote unit also enables control of uplink transmit power level. In this way, each remote unit maintains constant or within the proper range the signal power level received at its serving base station. In addition, the equality symbol of mathematical relationship as used in the claims may be replaced with an "approximate" symbol since, in order to carry out the invention, signal value may be estimated. Further, the terms attenuation and gain may be used interchangeably. The open loop power control methods and system may be used for voice, video and data transmitted over the network. Accordingly, it is the intent to include within the scope of the invention those modifications, substitutions, and variations as may come to those skilled in the art based on the teachings herein.

We claim:

1. A method of controlling transmit power in an OFDM transmission system, said method comprising:
   (a) transmitting from a transmitting end of said transmission system a series of pilot tones on multiple sub-channels of an OFDM transmission;
   (b) detecting on each of said sub-channels a power level of received pilot tones at a remote end OFDM receiver;
   (c) determining path loss in a physical path between the transmitting end and the remote end based on the level of the received pilot tones; and
   (d) controlling transmit power level of a transmitter associated with the remote end OFDM receiver by adjusting transmit power level according to the path loss determined in the determing step.

2. The method as recited in claim 1, wherein said determining step includes determining path loss based on the relationship: $P_t^{(m)}=K-P_r^{(m)}$.

3. The method as recited in claim 1, wherein said controlling step includes controlling the gain or attenuation Gtatt of the transmit power level according to the relationship $Gtatt=(L_E+Gtmax-Gmax+G_{TTA}-L_{TD}-Lref+L_B)+Gatt$ where $L_E$ is the signal power at a base station, Gtmax is the maximum gain in the transmitting path of the remote unit, $G_{TTA}$ is the gain at a tower top amplifier of a base station, and $L_{TD}$ is a downlink transmit power.

4. The method as recited in claim 3, wherein said controlling step includes controlling the gain or attenuation Gtatt of the transmit power level according to the relationship: $Gtatt=\alpha \cdot Gtatt+(1-\alpha) \cdot Gtatt$ where $\alpha$ is a forget factor for a moving average of Gtatt.

5. The method as recited in claim 1, wherein the determining step includes using AGC set points at the remote unit to determine path loss.

6. A system for controlling transmit power in an OFDM wireless transmission system comprising:
   (a) a base station that transmits pilot tones on at least one sub-channel of an OFDM transmission;
   (b) a remote unit that detects a power level of received pilot tones at a remote end OFDM receiver on each of said sub-channels;
   (c) signal processing circuitry in the remote unit that determines path loss in a physical path between the base station and the remote end based on the levels of the received pilot tones; and
   (d) an attenuation controller at the remote unit that controls transmit power level of a transmitter by adjusting transmit power level according to the path loss.

7. The system as recited in claim 6, wherein the attenuation controller determines path loss based on the relationship: $P_t^{(m)}=k-P_r^{(m)}$.

8. The system as recited in claim 6, wherein the controlling step controls a gain or attenuation Gtatt of the transmit power according to the relationship $Gtatt=(L_E+Gtmax-Gmax+G_{TTA}-L_{TD}-Lref+L_B)+Gatt$ where $L_E$ is the signal power at a base station, Gtmax is the maximum gain in the transmitting path of the remote unit, $G_{TTA}$ is the gain at a tower top amplifier of a base station, and $L_{TD}$ is a downlink transmit power.

9. The system as recited in claim 6, wherein the attenuation controller controls the gain or attenuation Gtatt of the transmit power level according to the relationship: $Gtatt=\alpha G \cdot Gatt+(1-\alpha) \cdot Gtatt$ where $\alpha$ is a forget factor for a moving average of Gtatt.

10. The system as recited in claim 6, further including:
    (a) a detector at the base station that monitors the received signal level of uplink pilot tones transmitted by the remote units and checks if received signal level of uplink pilot tones is outside pre-set limits around the target level at the start of each call; and (b) a controller that sends a command to the remote end over a broadcast channel to increase or decrease the transmit power level if it falls outside of prescribed limits.

11. The system as recited in claim 6, wherein said processing circuit includes an AGC circuit that provides an indication of path loss.

12. An apparatus that controls the power of a mobile station transmission signal in an OFDM-based wireless system, said apparatus comprising:
(a) a base station having a receiving channel and a transmittal channel;
(b) a subscriber unit physically remote from said base station having a receiving channel and a transmit channel;
(c) an automatic gain control circuit for conveying a path loss measurement between said base station and said subscriber unit wherein said path loss measurement is based on a strength of OFDM signals of known power received by said subscriber unit over multiple OFDM sub-channels; and
(d) a transceiver located in said subscriber unit having the transmitting power level thereof set by adjusting an attenuation reading of said transmitting channel according to the readings of the automatic gain control circuit.

13. A method of controlling transmit power in an OFDM wireless transmission system, said method comprising:
(a) transmitting from a transmit end of said system a series of pilot tones over multiple sub-channels of an OFDM transmission;
(b) detecting respective power levels of received pilot tones at a remote end OFDM receiver;
(c) determining path loss along a physical path between the transmit end and the remote end based on the level of the received pilot tones using AGC set points of a receiver; and
(d) controlling transmit power level of a transmitter by adjusting transmit power level according to the path loss determined in the determining step.

14. A method of controlling transmit power in an OFDM wireless transmission system, said method comprising:

(a) transmitting from a transmit end of said system a series of pilot tones on multiple sub-channels of an OFDM transmission;
(b) detecting a power level of received pilot tones at a receiver;
(c) determining path loss along a physical path between the transmit end and the receiver based on the level of the received pilot tones using AGC set points of a receiver based on the relationship $P_t^{(m)}=K-P_r^{(m)}$; and
(d) controlling transmit power level of a transmitter by adjusting transmit power level according to the path loss determined in the determining step.

15. A system for controlling transmit power in an OFDM wireless transmission system comprising:
(a) a transmitter that transmits from a transmit end of said system a series of pilot tones on multiple sub-channels of an OFDM transmission;
(b) a receiver that detects power levels of received pilot tones at a receiver;
(c) circuitry that determines path loss along a physical path between the transmit end based on the levels of the received pilot tones using AGC set points of a receiver and that controls transmit power levels of a transmitter by adjusting transmit power level according to the path loss.

16. A system for controlling transmit power in an OFDM transmission system comprising:
(a) a transmitter that transmits from a transmit end of said system a series of pilot tones on multiple sub-channels of an OFDM transmission;
(b) a detector that detects power levels of received pilot tones at a receiver;
(c) a circuit that determines path loss along physical path between the transmit end and the receiver based on the levels of the received pilot tones using AGC set points of a receiver based on the relationship $P_t^{(m)}=K-P_r^{(m)}$ and that controls a transmit power level of a transmitter by adjusting transmit power level according to the path loss.

* * * * *